UNITED STATES PATENT OFFICE.

NATHANIEL T. BACON, OF PEACE DALE, RHODE ISLAND, ASSIGNOR TO THE SOLVAY PROCESS COMPANY, OF SOLVAY, NEW YORK, A CORPORATION OF NEW YORK.

PROCESS OF PURIFYING NITROGEN.

1,304,932.

Specification of Letters Patent. Patented May 27, 1919.

No Drawing. Application filed November 27, 1917. Serial No. 204,142.

*To all whom it may concern:*

Be it known that I, NATHANIEL T. BACON, a citizen of the United States, residing at Peace Dale, in the county of Washington and State of Rhode Island, have invented a new and Improved Process of Purifying Nitrogen, of which the following is a specification.

My invention relates to the recovery of nitrogen of such purity as to be suitable for use in the well known fixation processes and the object of my improvement specifically is to eliminate free oxygen and oxygen compounds which are particularly detrimental to the carrying out of such processes. In carrying my invention into effect I employ as the source of nitrogen the ordinary lime kiln operation in the gaseous product of which nitrogen is the principal constituent. In the burning of the limestone I use an excess of coke above that required to effect the reaction which may go as high as 20 per cent, so as to reduce to a trace the free oxygen present. This will result in the formation of a small quantity of CO gas but as this is unaltered in the processes for which the nitrogen is to be employed it may be looked upon simply as a diluent, as may also the small quantities of the inert gases, argon, helium, etc., and may be disregarded, leaving $CO_2$ as the only considerable impurity present with the nitrogen. I then remove the $CO_2$, which in the fixation process would give up oxygen and thus interfere with the result, by washing the gas in a strong solution of ammonium hydrate, as by causing it to bubble up through the solution in an ordinary wash tower.

Such excess of the solution should be employed that after washing the gas it shall carry at least 20 per cent. of the ammonia present as ammonium hydrate. Under these conditions practically all of the $CO_2$ will be absorbed in the liquor with formation of ammonium monocarbonate.

The nitrogen should then be washed with water in a separate washer to remove traces of ammonia and after settling out the water in suspension, with precautions to prevent other gases from becoming mixed with it, is ready to go into consumption.

In order to obtain the best results the wash liquor should be kept at a relatively low temperature, say 25° C., as by means of cooling coils and the absorption of the $CO_2$ will also be made more complete by effecting it under pressure. At the temperature given above a pressure of not much more than one atmosphere is sufficient, but at higher temperatures an increase of pressure is desirable. The carbonated liquor can be used for the formation of ammonium nitrate with the calcium nitrate from the recovery of nitric acid fumes, or in any other manner.

Having thus described my invention, what I claim as new and desire to secure by Letters Patent is:

1. The process of obtaining purified nitrogen which consists in separating nitrogen of the atmosphere from free oxygen by burning limestone with an excess of coke and absorbing the $CO_2$ content of the gaseous product in a solution of ammonium hydrate.

2. The process of obtaining purified nitrogen which consists in separating nitrogen of the atmosphere from free oxygen by burning limestone with an excess of coke and absorbing the $CO_2$ content of the gaseous product in a solution of ammonium hydrate in excess.

3. The process of obtaining purified nitrogen which consists in separating nitrogen of the atmosphere from free oxygen by burning limestone with an excess of coke and absorbing the $CO_2$ content of the gaseous product in a cooled solution of ammonium hydrate in excess.

4. The process of obtaining purified nitrogen which consists in separating nitrogen of the atmosphere from free oxygen by burning limestone with an excess of coke and absorbing the $CO_2$ content of the gaseous product under pressure in a solution of ammonium hydrate in excess.

5. The process of obtaining purified nitrogen which consists in separating nitrogen of the atmosphere from free oxygen by burning limestone with an excess of coke and causing the absorption of the $CO_2$ content of the gaseous product in a cooled solution of ammonium hydrate in excess and under pressure.

In testimony whereof I have affixed my signature, this 19th day of November 1917.

NATHANIEL T. BACON.